US012369756B2

(12) United States Patent
Jenkins et al.

(10) Patent No.: US 12,369,756 B2
(45) Date of Patent: Jul. 29, 2025

(54) COOKWARE HANDLE FOR HOUSING ELECTRONIC COMPONENTS

(71) Applicant: Meyer Intellectual Properties Ltd., Kowloon (HK)

(72) Inventors: Jonathan A. Jenkins, Seattle, WA (US); Brenden Duncombe-Smith, Seattle, WA (US); Joshua Robert Buesseler, Seattle, WA (US); Jedediah Joaquin McCann, Portland, OR (US); Eva Poon, Hong Kong (CN)

(73) Assignee: Meyer Intellectual Properties Ltd. (VG)

( * ) Notice: Subject to any disclaimer, the term of this patent is extended or adjusted under 35 U.S.C. 154(b) by 876 days.

(21) Appl. No.: 16/758,013

(22) PCT Filed: Oct. 21, 2019

(86) PCT No.: PCT/US2019/057159
§ 371 (c)(1),
(2) Date: Jun. 29, 2021

(87) PCT Pub. No.: WO2020/086435
PCT Pub. Date: Apr. 30, 2020

(65) Prior Publication Data
US 2022/0053979 A1 Feb. 24, 2022

Related U.S. Application Data

(60) Provisional application No. 62/748,979, filed on Oct. 22, 2018.

(51) Int. Cl.
*A47J 45/06* (2006.01)
(52) U.S. Cl.
CPC ............ *A47J 45/061* (2013.01); *A47J 45/068* (2013.01)

(58) Field of Classification Search
CPC ........ A47J 45/068; A47J 45/07; A47J 45/071; A47J 2202/00; A47J 27/002; A47J 36/321;
(Continued)

(56) References Cited

U.S. PATENT DOCUMENTS 4,624,136 A * 11/1986 Delatorre ............ E21B 41/0085
73/152.54
5,441,039 A 8/1995 Yeh
(Continued)

FOREIGN PATENT DOCUMENTS

CN 1745687 A 3/2006
CN 1745688 A 3/2006
(Continued)

OTHER PUBLICATIONS

Notification of Reasons for Refusal dated Jun. 7, 2022, issued in connection with corresponding Japanese Patent Application No. 2021-547045.
(Continued)

*Primary Examiner* — John E Breene
*Assistant Examiner* — Janice M Soto
(74) *Attorney, Agent, or Firm* — Akerman LLP

(57) ABSTRACT

A handle for a cookware device contains a power supply that is operative to energize one or more of a processor, transceiver and accelerometer, as well as a memory device. The processor is also connected to a one or more external leads that extend into the handle at least to the connection to a sidewall of cooking device for further connection to a sensing circuit or power harvesting circuit. The end of the handle holds at least the processor but is in removable engagement from the portion with the power supply with a resilient sealing member to form a water proof seal.

22 Claims, 11 Drawing Sheets

(58) Field of Classification Search
CPC . A47J 45/061; H01R 33/965; H01R 33/9651; H01R 33/9653; G01K 1/14; G01K 13/00; G01K 2207/08; G01K 2207/02; H05B 6/062; H05B 2213/06; Y10S 220/912
USPC ........................................................ 374/208
See application file for complete search history.

(56) References Cited

U.S. PATENT DOCUMENTS

| | | | |
|---|---|---|---|
| 9,955,529 | B2 | 4/2018 | Baarman et al. |
| 2004/0016348 | A1* | 1/2004 | Sharpe ................... A47J 36/321 99/422 |
| 2004/0043667 | A1* | 3/2004 | Chen ..................... H01R 13/622 439/662 |
| 2013/0120978 | A1* | 5/2013 | Opolka ................... F21L 4/005 362/202 |
| 2015/0082996 | A1 | 3/2015 | Wu |
| 2015/0208845 | A1 | 7/2015 | Robbins et al. |
| 2016/0051078 | A1* | 2/2016 | Jenkins ..................... F24C 7/08 99/341 |
| 2018/0205051 | A1 | 7/2018 | Sakai et al. |
| 2018/0338644 | A1* | 11/2018 | Gossens ................ A47J 45/068 |

FOREIGN PATENT DOCUMENTS

| | | |
|---|---|---|
| CN | 101273834 A | 10/2008 |
| CN | 103096764 A | 5/2013 |
| CN | 105125058 A | 12/2015 |
| CN | 107080478 A | 8/2017 |
| CN | 207384152 | 5/2018 |
| CN | 214433659 U | 10/2021 |
| DE | 20203566 U1 | 5/2002 |
| JP | 2014-522690 A | 9/2014 |
| JP | 2018-512937 A | 5/2018 |
| JP | 2022508944 A | 1/2022 |
| KR | 200338569 Y1 * | 1/2004 |
| WO | WO-9837361 A1 * | 8/1998 ........... B60Q 3/0289 |
| WO | 2008/119207 A1 | 10/2008 |
| WO | 2013/007927 A1 | 1/2013 |
| WO | WO-2018022781 A1 * | 2/2018 ............ A47J 36/321 |
| WO | 2017073004 A1 | 3/2018 |

OTHER PUBLICATIONS

Supplementary Partial European Search Report, dated Feb. 3, 2022, issued in connection with corresponding European Application No. 19875597.7.

Extended European Search Report, dated May 4, 2022, issued in connection with corresponding European Application No. 19875597.7.

First Office Action and Search Report, dated Nov. 3, 2021, issued in connection with corresponding Chinese Application No. 2019800698599.

International search report and written opinion on patentability application No. PCT/US19/57159 Dated Mar. 31, 2020.

Notification of Reasons for Refusal issued Mar. 19, 2024 in connection with corresponding Japanese Patent Application No. 2022-206179.

Decision to Grant issued Oct. 1, 2024 in connection with corresponding Japanese Patent Application No. 2022-206179.

Notification on Grant of the Patent Right for Invention issued Mar. 15, 2022 in connection with corresponding Chinese Patent Application No. 2019800698599.

Extended European Search Report issued Mar. 27, 2024 in connection with corresponding European Patent Application No. 24153202.7.

Decision to Grant issued Nov. 22, 2022 in connection with corresponding Japanese Patent Application No. 2021-547045.

* cited by examiner

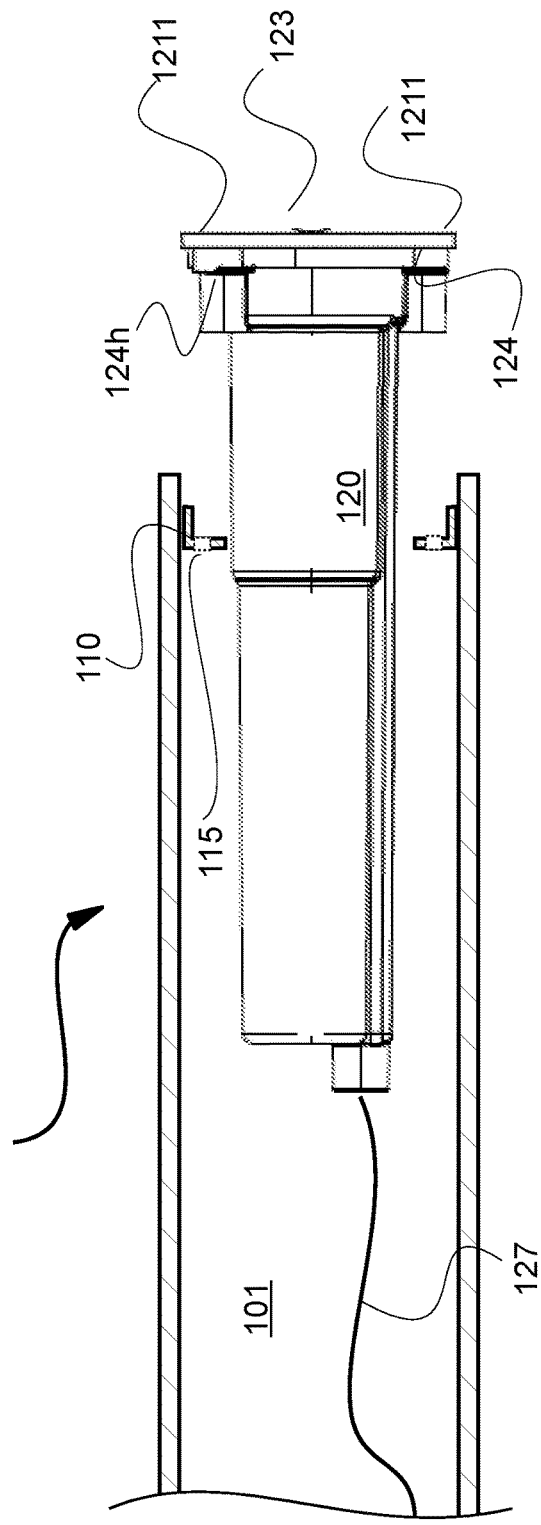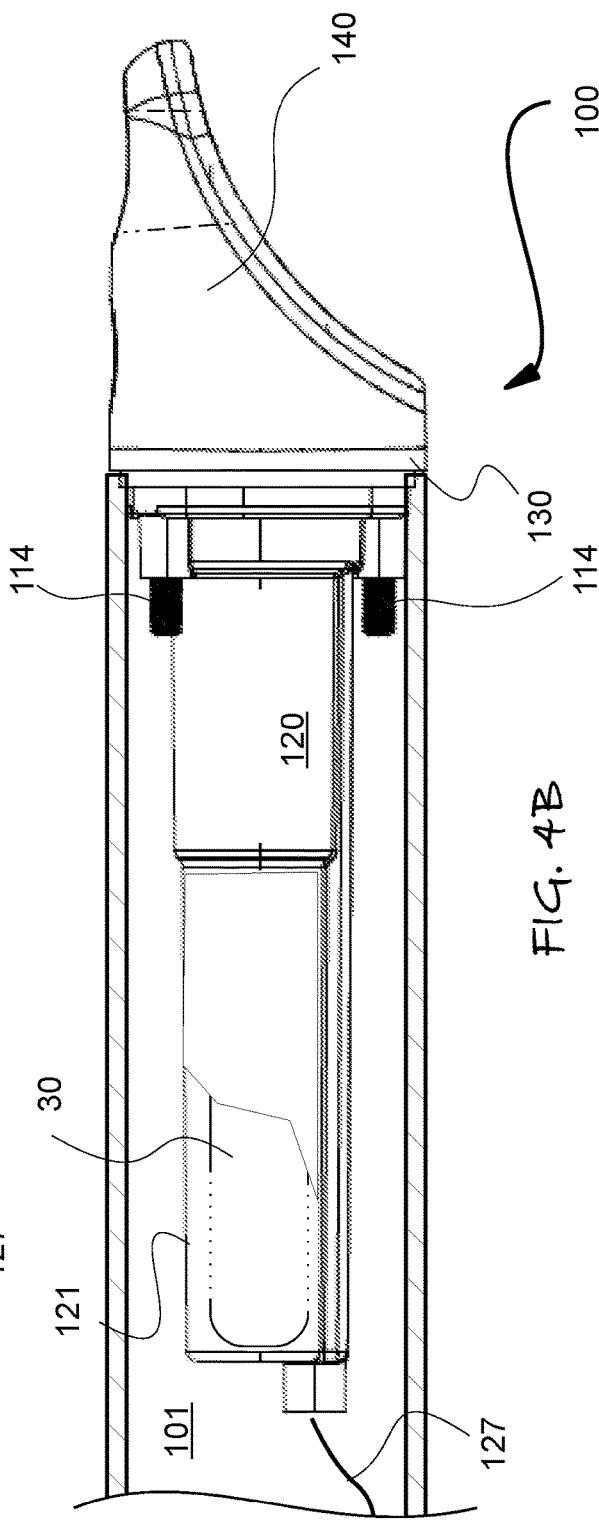

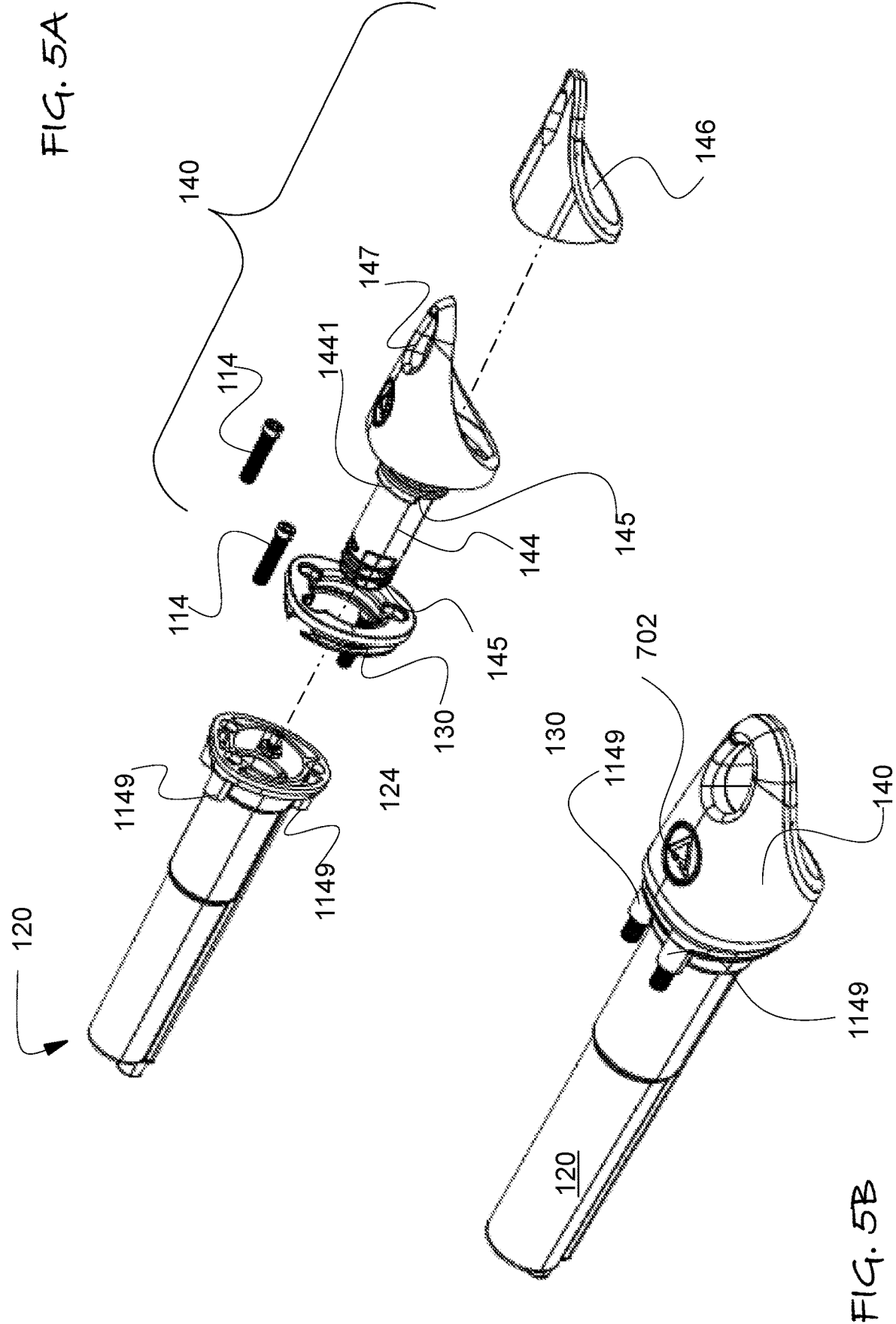

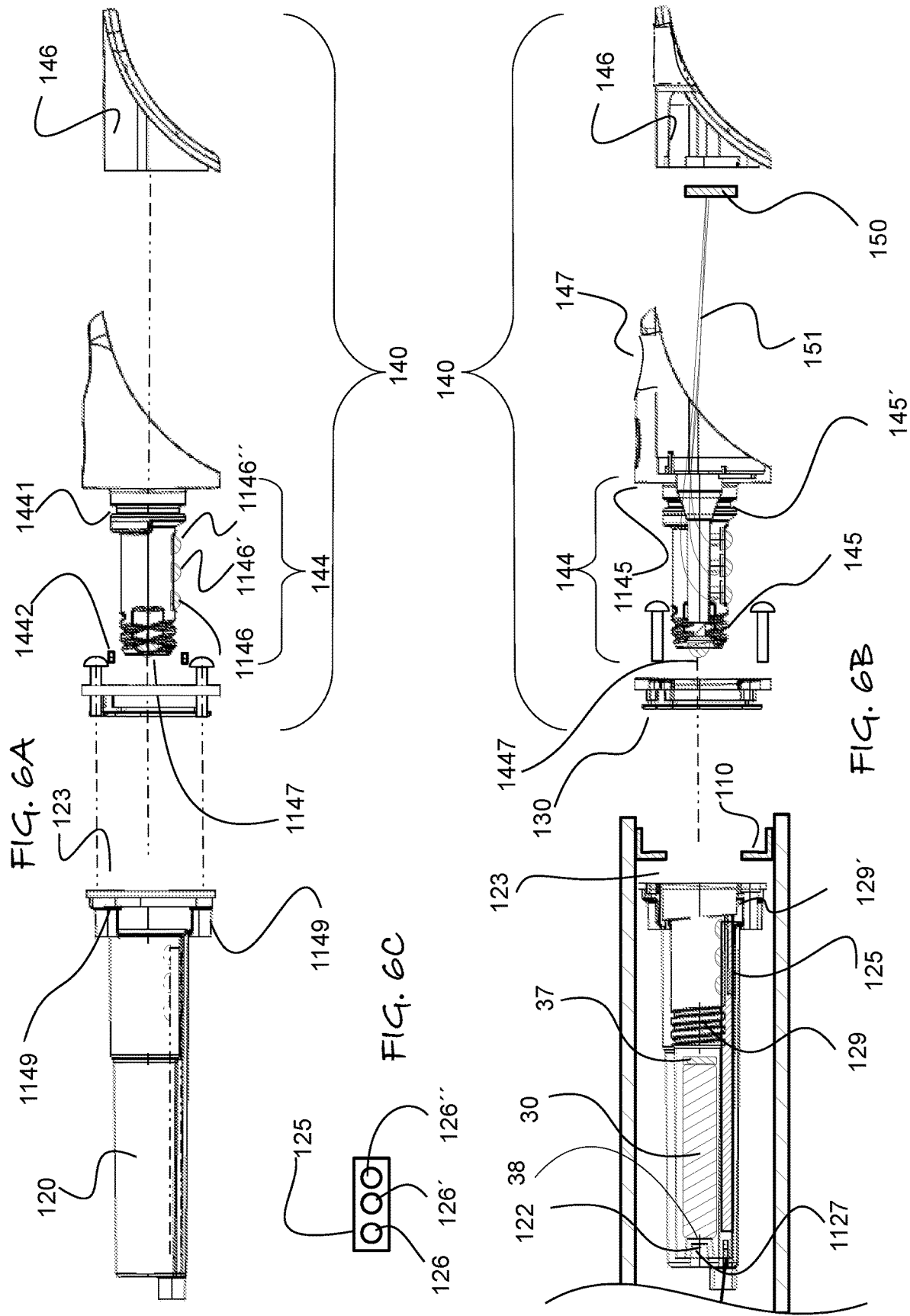

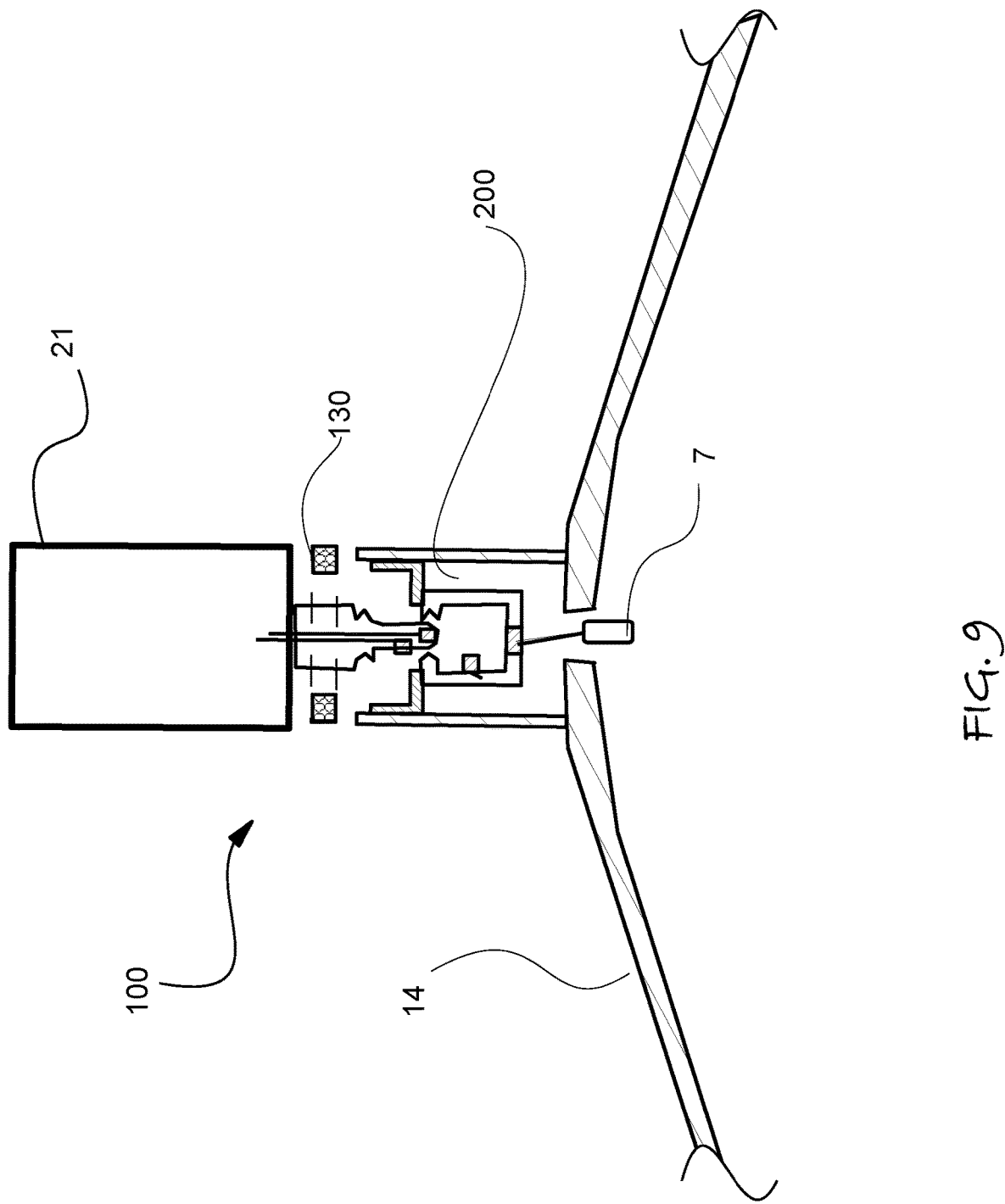

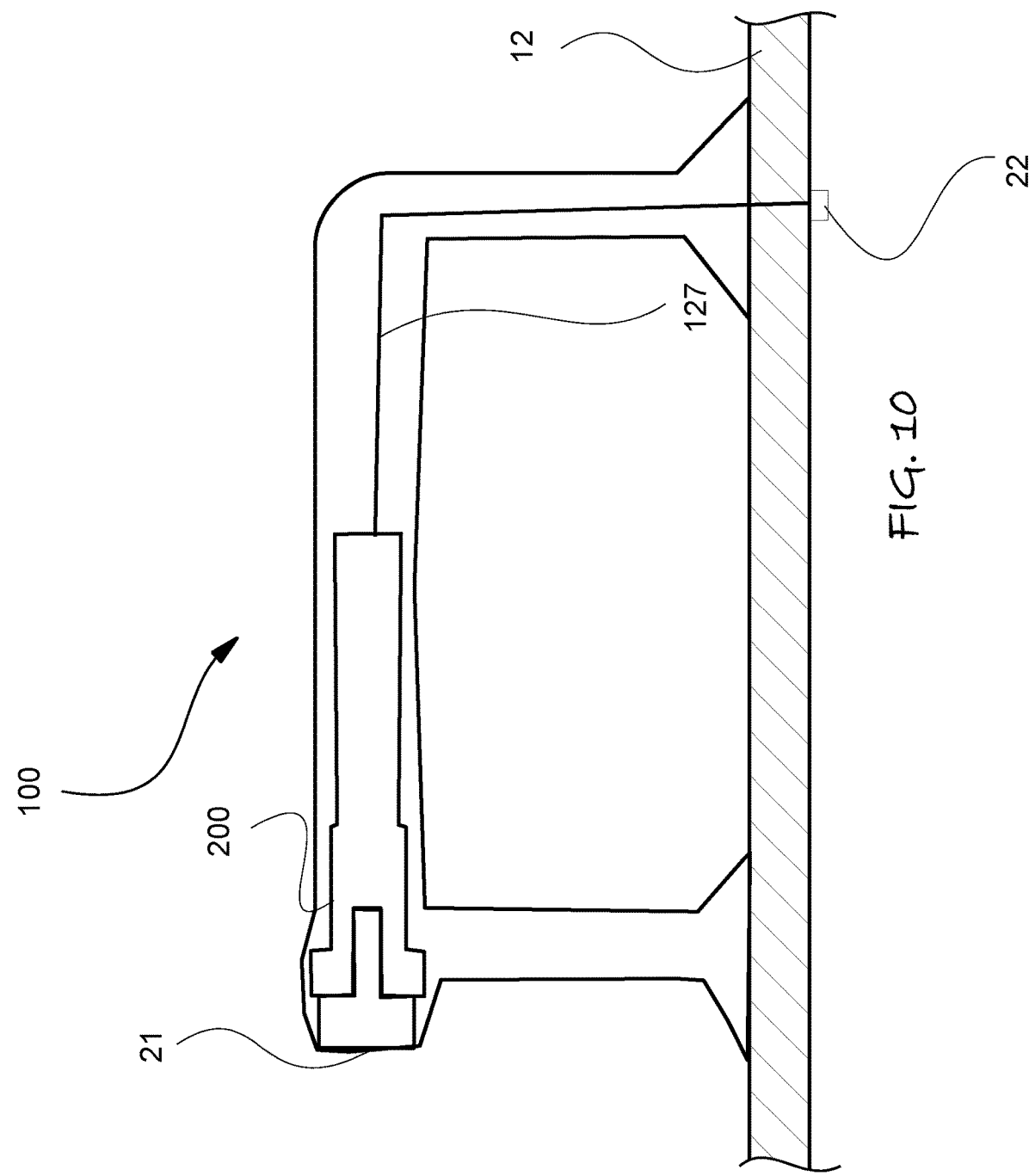

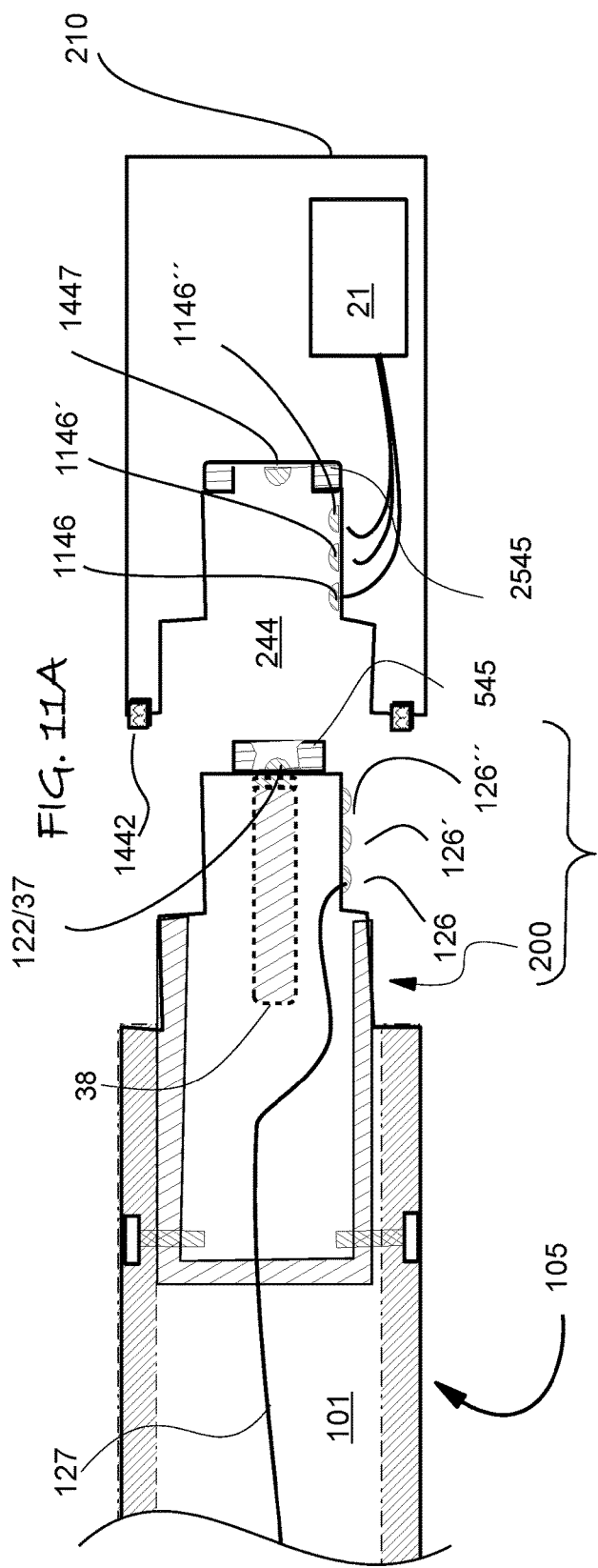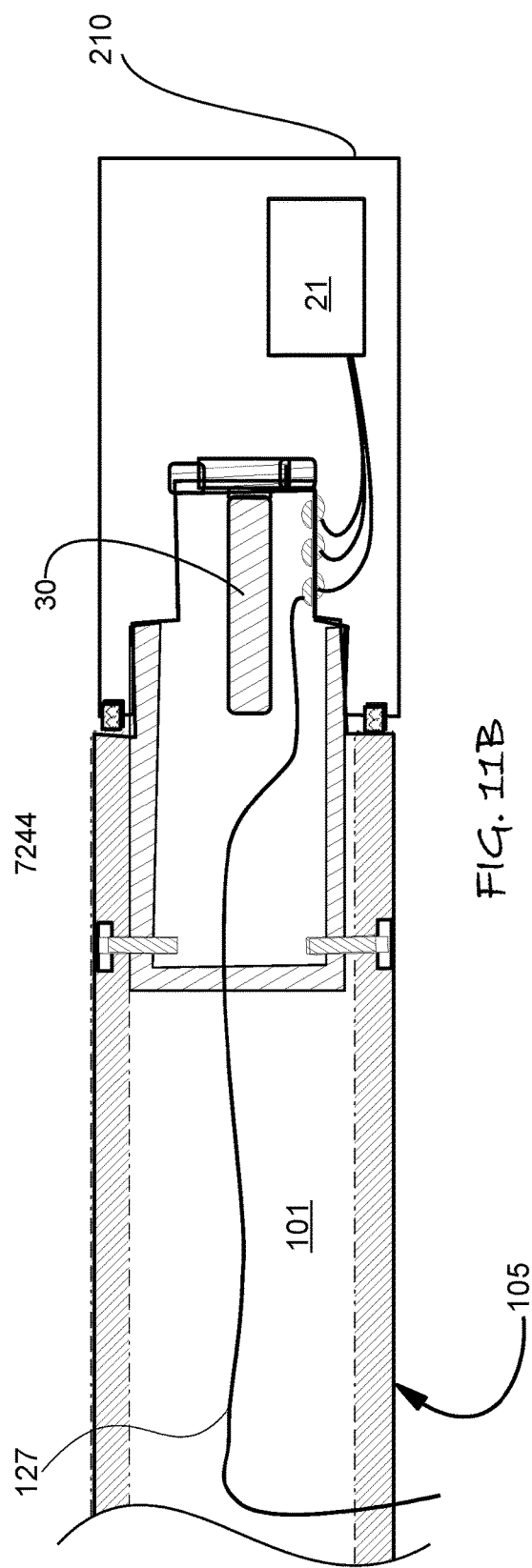

COOKWARE HANDLE FOR HOUSING ELECTRONIC COMPONENTS

CROSS REFERENCE TO RELATED APPLICATIONS

The present application claims the benefit of priority to the U.S. Provisional Patent application of the same title that was filed on Oct. 22, 2018, having application Ser. No. 62/748,979, and is incorporated herein by reference.

The present application also claims the benefit of priority to the PCT application that was filed on Oct. 21, 2019, having international application no., and is incorporated herein by reference.

BACKGROUND OF INVENTION

The present invention relates to cookware, and more particularly handles for cookware that contain electronic components.

It is desirable to include in cookware handles electronic components for the purposes of measuring and communicating cookware temperature, movement and position.

The handle of the cookware may provide a housing for these components, however, it is desirable for the housing to be well sealed to prevent ingress of water or cleaning fluids so the consumer may use traditional cleaning methods if desired, including placing the cookware to be cleaned in a dishwashing machine.

It is also desirable that the sealing method is highly reliable, inexpensive to manufacture and assemble, and consumer friendly for replacement in case of failure or need to replace the power source, such as a battery.

In light of the benefits of including electronic components in cookware handles, a first object of the present invention to provide a handle for cookware that is configured to be inexpensive to manufacture and assemble that deploys a sealing method that is highly reliable and consumer friendly for replacement in case of failure or need to replace the power source, such as a battery.

SUMMARY OF INVENTION

In the present invention, the first object is achieved by providing a handle for a cookware article that comprises a flange portion having a distal end for connection to one of a cookware vessel and a lid of a cookware vessel, the flange portion also having a proximal end opposing the distal end, an elongated cavity extending form the distal end of the flange portion toward a rim that defines a perimeter of an open distal end of the elongated cavity, an interconnection module disposed within the elongated cavity, an electronic module for sealing the open distal end of the elongated cavity at the rim to form at least a distal portion of the handle for the cookware article, the electronic module comprising at least one electronic component, one of the interconnection module and the electronic module comprising a male appendage that is received in the other module, at least one external lead that extends from the flange portion to the interconnection module to make a connection with a first terminal of the electronic module, wherein said first terminal is in one of signal and power connection to the at least one electronic component in which the connection is capable of being disengaged when the electronic module is rotated with respect to the interconnection module to disconnect a pair of contact terminal of which a first contact terminal of the pair is on the male appendage and a second contact terminal of the pair is on the other module that does not comprise the male appendage.

A second aspect of the invention is characterized by such a handle for a cookware article wherein the connection of the first terminal of the electronic module is disengaged from the interconnection module when the electronic module is separated from the rim of the elongated cavity.

Another aspect of the invention is characterized by such a handle for a cookware article wherein the first contact of the pair is on a cylindrical surface of the male appendage.

Another aspect of the invention is characterized by any such handle for a cookware article further comprising a gasket to provide a common seal between the rim of the elongated cavity and the rim of the electronic module.

Another aspect of the invention is characterized by any such handle for a cookware article further comprising a gasket to provide a common seal between the rim of the elongated cavity and the rim of the electronic module and wherein the cylindrical surface of the male appendage further comprises at least one annular o-ring to seal a compartment of the interconnection module that contains a battery.

Another aspect of the invention is characterized by any such handle for a cookware article wherein the male appendage has a set of external helical threads that engage a set of internal helical threads on a portion of the other module in which one of the internal helical threads and external helical threads has an end stop that limits the rotation of the male appendage to align and connect the terminals of the electronic module to mating terminals of the interconnection module.

Another aspect of the invention is characterized by any such handle for a cookware article wherein the male appendage has a first set of external helical threads adjacent a distal end of the male appendage the first enters the other module and a second set of external helical threads disposed at a proximal end of the male appendage that is opposed from the distal end in which the first and second set of external helical threads each engage a corresponding sets of internal helical threads on spaced apart portions of the other module.

Another aspect of the invention is characterized by any such handle for a cookware article further comprising a plurality of contact terminals disposed on each module between a first and a second set of helical threads.

Another aspect of the invention is characterized by any such handle for a cookware article wherein the male appendage has a first set of external annular threads adjacent a distal end of the male appendage the first enters the other module and a second set of annular threads disposed at a proximal end of the male appendage that is opposed from the distal end in which the first and second set of external threads each engage corresponding sets of internal thread on spaced apart portions of the other module.

Another aspect of the invention is characterized by any such handle for a cookware article further comprising a plurality of contact terminals disposed on each module between the first and second set of annular threads.

Another aspect of the invention is characterized by any such handle for a cookware article wherein a cylindrical surface of the male appendage comprises one of more additional contact terminals that form a disengagable signal or power connection between the interconnection module and the electronic module.

Another aspect of the invention is characterized by any such handle for a cookware article wherein the male appendage is on the electronic module and is received within a cavity within the interconnection module when the electronic module seals the open distal end of the elongated cavity at the rim to form at least a distal portion of the handle for the cookware article.

Another aspect of the invention is characterized by any such handle for a cookware article wherein the cavity within the interconnection module has a battery module that includes opposing polarity terminals that are capable of disengable connection to the electronic component of the electronic module when the electronic module and interconnection module are separated to one of remove and insert a batter in the battery module.

Another aspect of the invention is characterized by any such handle for a cookware article further comprising a circuit board disposed within the interconnection module that connects one opposing terminal at a distal end of the battery module to a contact terminal on the circuit board in which the circuit board is disposed to engage the contact terminal with a connecting terminal disposed on a cylindrical surface of the male appendage, in which the connecting terminal provides is in power communication with the electronic module.

Another aspect of the invention is characterized by any such handle for a cookware article wherein the electronic module comprises an O-ring seated in an annular groove that is adapted to seal the battery module when an end cap containing the electronic module compresses a first generally annular outer gasket to seal the rim of the elongated cavity.

Another aspect of the invention is characterized by any such handle for a cookware article further comprising a gasket to provide a common seal between the rim of the elongated cavity and the rim of the electronic module.

Another aspect of the invention is characterized by any such handle for a cookware article further comprising a gasket to seal the rim of the elongated cavity and seal the electronic module and wherein the cylindrical surface of the male appendage further comprises a first annular o-ring to seal a compartment of the interconnection module that contains a battery and a second annular o-ring.

Another aspect of the invention is characterized by any such handle for a cookware article wherein the cookware article is a cookware vessel and the handle is connected to a sidewall of the cookware vessel via a flange.

Another aspect of the invention is characterized by any such handle for a cookware article wherein the cookware article is a lid for covering a cookware vessel.

Another aspect of the invention is characterized by any such handle for a cookware article further comprising a flange insert disposed adjacent the rim of the elongated cavity in which the interconnection module is couple to the flange insert to space exterior surface of the interconnection module away from an interior wall of the elongated cavity.

Another aspect of the invention is characterized an article of cookware comprising one of a lid and vessel body that is attached to a handle in which the handle comprises a flange portion having a distal end for connection to one of a cookware vessel and the lid of a cookware vessel, the flange portion also having a proximal end opposing the distal end, an elongated cavity extending form the distal end of the flange portion toward a rim that defines a perimeter of an open distal end of the elongated cavity, an interconnection module disposed within the elongated cavity, an electronic module for sealing the open distal end of the elongated cavity at the rim to form at least a distal portion of the handle for the cookware article, the electronic module comprising at least one electronic component, one of the interconnection module and the electronic module comprising a male appendage that is received in the other module, at least one external lead that extends from the flange portion to the interconnection module to make a connection with a first terminal of the electronic module, wherein said first terminal is in one of signal and power connection to the at least one electronic component in which the connection is capable of being disengaged when the electronic module is rotated with respect to the interconnection module to disconnect a pair of contact terminal of which a first contact terminal of the pair is on the male appendage and a second contact terminal of the pair is on the other module that does not comprise the male appendage.

Another aspect of the invention is characterized by such an article of cookware in which the electronic module of the handle comprises at least one of a user interface and a display.

Another aspect of the invention is characterized by such a handle for a cookware article that comprises an elongated cavity with a rim that defines a perimeter of an open distal end thereof, a flange insert disposed within the elongated cavity and set back from the open distal end of the elongated cavity, a battery module having an inner cavity for receiving a battery and an open distal end and a rim flange surrounding the open distal end for coupling to the flange insert, and further comprising a first circuit board and at least one external lead in which the battery module extends at least into the elongated cavity and has at least one internal battery terminal connected to the first circuit board and in which the first circuit board has a plurality of external terminals, each in one of a power or signal communication with the at least one internal battery terminal and the external lead, an end cap with one or more threaded sections for insertion into the battery module for connecting to mating threads of the battery module to seal the open distal end of the elongated cavity, the end cap being configured to house a second circuit board to connect to at least one external terminals of the first circuit board when the end cap seals the open distal end of the elongated cavity and a first generally annular outer gasket disposed to seal the rim of the elongated cavity on a proximal side and the end cap on a distal side.

Another aspect of the invention is characterized by such an article of cookware wherein the electronic module comprises a second internal battery terminal that for making electrical connection to an opposing terminal of a battery than the least one internal battery terminal.

Another aspect of the invention is characterized by any such article of cookware wherein the portion of the end cap that enter the battery module to connect the second circuit board to the one or more external terminals of the first circuit board has a plurality of external terminals that connect to the first circuit board that are disposed on the sides of a cylindrical portion of the end cap.

Another aspect of the invention is characterized by any such article of cookware wherein the end cap comprises a second internal battery terminal that for making electrical connection to an opposing terminal of a battery than the least one internal battery terminal on an end of a cylindrical portion of the end cap.

The above and other objects, effects, features, and advantages of the present invention will become more apparent from the following description of the embodiments thereof taken in conjunction with the accompanying drawings.

BRIEF DESCRIPTION OF DRAWINGS

FIG. 4A is an enlarged cross-sectional illustration of the embodiment of FIG. 1 showing the elongated cavity with the attached flange insert before insertion of the battery module, whereas FIG. 4B corresponds to the same portion of FIG. 3 at the scale of FIG. 4A.

FIG. 5B is a perspective view of the components of the battery module, annular outer gasket and end cap, whereas FIG. 5A is an exploded perspective view of the components of the battery module, annular outer gasket and end cap.

FIG. 6A is an exploded exterior elevation view of the battery module, annular outer gasket and end cap components, whereas FIG. 6B is an exploded cross-section elevation view thereof. FIG. 6C is a top plan view of circuit board in the battery module.

FIG. 9 is a schematic cross-section view of another embodiment of the invention.

FIG. 10 is a schematic cross-section view of another embodiment of the invention.

FIGS. 11A and 11B are schematic cross-section views of another embodiment of the invention in which FIG. 11A illustrates the disassembled state in contrast to the assembled state in FIG. 11B.

DETAILED DESCRIPTION

Figure 1:
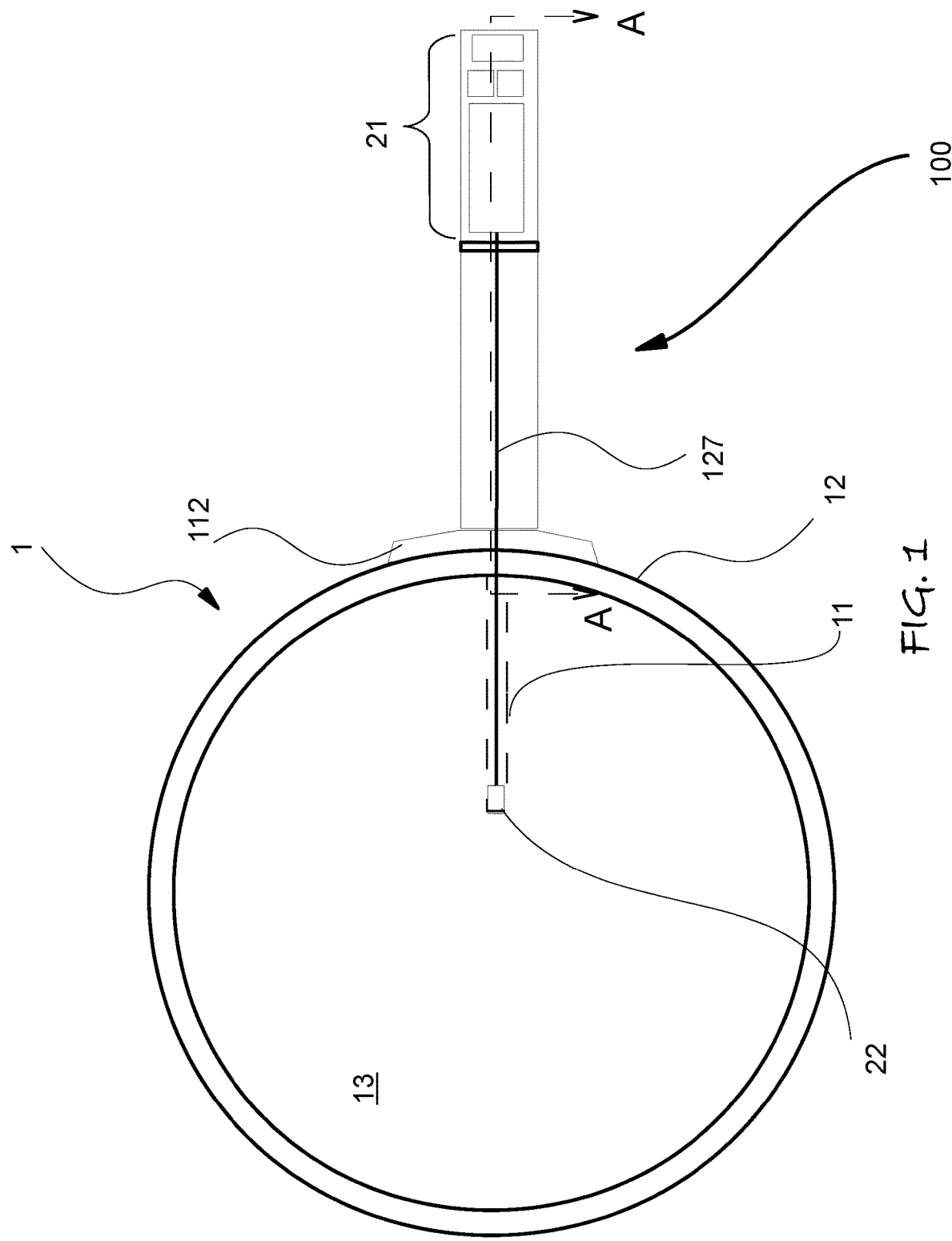
FIG. 1 is a schematic plan view of an embodiment of the invention.

Referring to FIGS. 1 through 11B, wherein like reference numerals refer to like components in the various views, there is illustrated therein a new and improved Cookware Handle for Housing Electronic Components, generally denominated 100 herein.

In accordance with the present invention the handle 100 is intended for attachment to a cookware vessel 1 or cookware vessel lid 14 as illustrated in FIGS. 1 and 11 respectively. In the case of the cookware vessel 1 in FIG. 1 at least one external lead 127 extends from an electronic module 21 in the distal end of the handle 100 to at least the sidewall 12 of the cookware vessel 1 to connect with a circuit component 22 on the exterior or interior of the cookware vessel 1. The circuit component 22 may be in a cavity or bore 11 formed in the bottom 13 of the cookware vessel 1 or as part of a surface of the cookware vessel 1 or a vessel lid 14.

The circuit component 22 is optionally a sensor provided for measuring a property of the contents of the cookware vessel 1 or state of the cookware vessel 1, such as a thermal sensor 7, as for example a thermistor or thermocouple, for measuring temperature. Alternatively, the circuit component 22 can be a loop circuit or plurality of thermopile for harvesting power from either heat or induced current, such as from the field generated by an induction cooking coil. U.S. Pat. No. 9,955,529 (Issued to Baarman, D. et al. on 2018 Apr. 24), which is incorporated herein by reference, discloses circuitry in an electronic module in cookware handle that is configured to harvest energy from a loop circuit in the cookware handle or cookware base, including rectification circuitry, power control circuitry, power storage circuitry, a controller, communication circuitry, a temperature sensor, and a user interface 702.

Alternatively, or in addition to measuring temperature or state of the vessel, the circuit component 22 may be or include an accelerometer or magnetometer to measure or detect movement, vibrations, position and/or orientation, both relative and absolute, as well as a wired or wireless communication components to transmit and receive information from another cooking appliance, such as a heat source or burner, as well as another control or display device, such as a portable computer, tablet, smart phone, communication network and/or network server.

The electronic module 21 in the handle 100 may also include one or more of accelerometer or magnetometer to measure or detect movement, vibrations, position and/or orientation, both relative and absolute, as well as a wired or wireless communication components to transmit and receive information from another cooking appliance, such as a heat source or burner, as well as another control or display device, such as a portable computer, tablet, smart phone, communication network and/or network server.

The electronic module 21 in the handle 100 may also include a user interface 702, which in the case of a touch screen electronic display 701 is integrated therein, but can also be discrete and control switches and the like to modify the display to indicate status of any circuit component 22, that is the value derived from the signal in the at least one external lead 127, as well as to set or display operating parameters for cooking such as programmed time or temperature in a cooking stage, actual time or temperature during or before a cooking stage, elapsed or remaining time in a cooking stage, or to advance or scroll within an electronic display of a cooking recipe, such as on an external smart phone or tablet computer in wireless communication with the electronic module 21.

In such a case the electronic module 21 in the handle 100 needs to be sealed if the cookware vessel 1 is to withstand immersion in water for washing or cleaning in an automated dishwasher cycle. The electronic module 21 may also need to have a battery that provides power replaced or component of the electronic module replaced in case or failure or to provide a capability upgrade.

Figure 2:
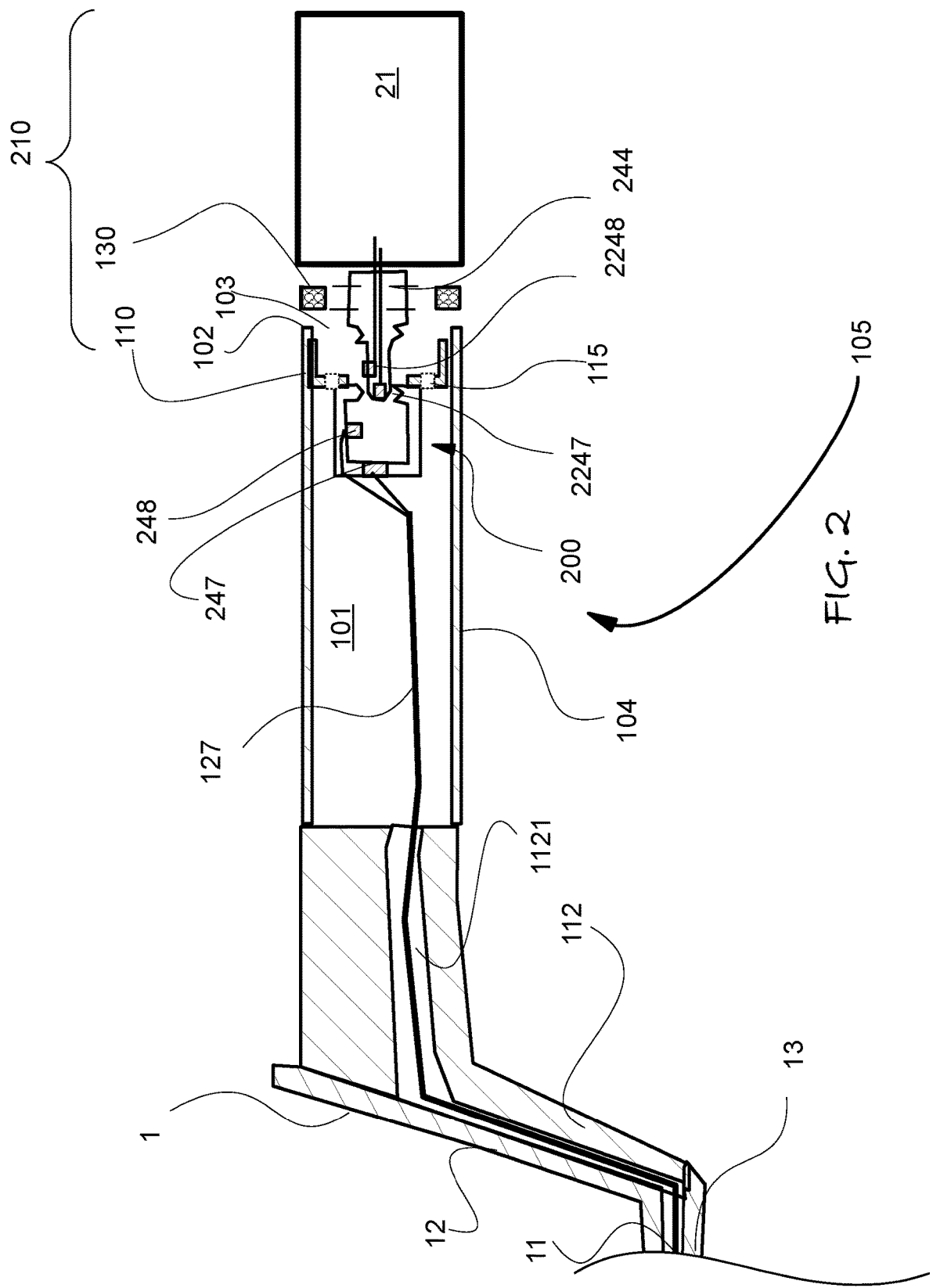
FIG. 2 is a schematic section view of the portion of FIG. 1 corresponding to section line A-A in FIG. 1.
Figure 3:
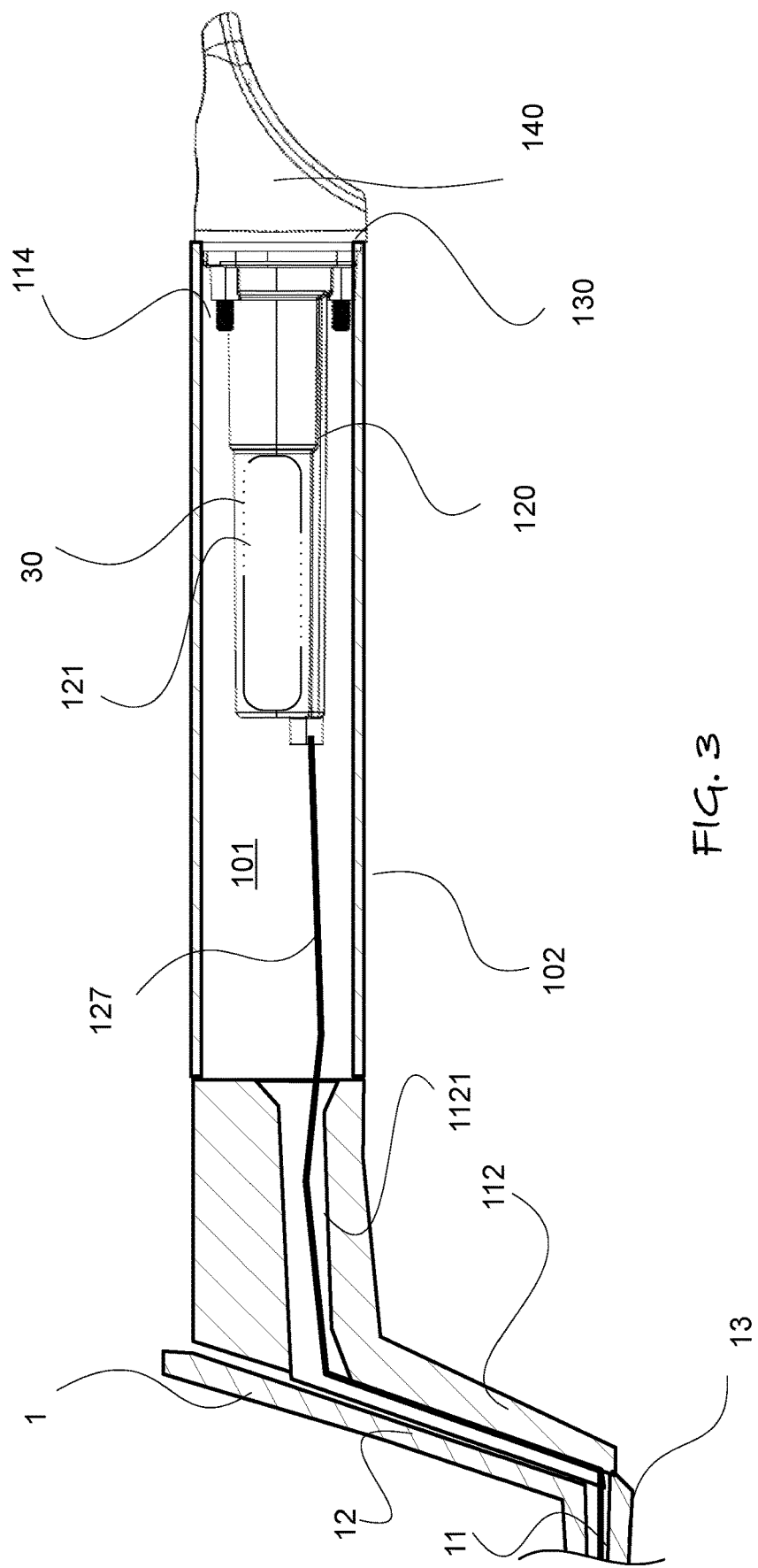
FIG. 3 is a partial cross-sectional illustration of an embodiment of the handle shown attached to a cookware vessel.

FIG. 2 illustrates further details of how the electronic module 21 may be sealed in the handle 100 and is in signal communication with an interconnection module 200. The interconnection module 200 is connected to the at least one external lead 127 at a terminal 247, and preferably at least one additional terminal 248.

The electronic module 21 may have a male appendage 244 with external terminals 2247 and 2248 that are in signal or power connection with the electronic module 21.

The insertion and sealed engagement of the male appendage 244 into the interconnection module 200 brings terminals 247 and 2247 into contact, as well as bring terminal 248 into contact with terminal 2248.

In selected embodiments the interconnection module 200 may receive a replaceable or rechargeable battery 30, and is designated as a battery module 120. Alternatively, a battery 30 may be disposed in a compartment within or adjacent the electronic module 21, which may form the distal end of the handle 100 that is used for gripping by a user, as in the embodiment of FIG. 10. The male appendage 244 is intended to be securely engaged in the interconnection module 200. The secure engagement of the male appendage 244 in the interconnection module 200 is optionally via a bayonet style mount or a complementary thread or mount component at the perimeter of the opening of the interconnection module 200. Depending on the power requirements of the electronic components of the electronic module 21 of the handle 100, a replaceable and/or rechargeable battery 30 may be disposed in each of the interconnection module 200 and the housing 210 for the electronic module 21 and the component thereof.

When the bayonet or thread connection of the interconnection module 200 and electronic module 21 are fully engaged a gasket or O-ring 130 disposed between the proximal end of the housing 210 seals the open distal end 103 in the first fitting 105 of the handle 100 that contains the interconnection module 200.

Such a handle 100 for a cookware vessel 1 thus comprises a first fitting 105 having an elongated handle cavity 101 with a rim 102 that defines the perimeter of an open distal end 103 thereof.

The fitting 105 may have a flange 112 portion opposing the open distal end 103, such that the flange 112 portion of the handle 100 is intended to contact and be fastened to the sidewall 12 of the cookware vessel 1.

The interconnection module 200 and battery module 120 are held in the cavity 101 via a flange insert 110. The flange insert 110 may be disposed within the elongated handle cavity 101 and set back from the open distal end 103 of the elongated cavity 101. In the case of a first fitting 105 being made of metal, the flange insert 110 may be spot welded to the walls 104 of the fitting 105 adjacent the rim 102. Since the fitting 105 may have a metallic flange portion coupled to a plastic or molded resin or composite portion, which provides the walls 104 that create cavity 101, the flange insert 110 is optionally molded into or otherwise integrally formed with the fitting 105. The flange insert 110 can also be any portion of the interconnection module 200 that is coupled to the walls 104 of the fitting 105. As such the flange insert 110 molded or formed integrally with the interconnection module 200.

Further non-limiting example of the flange insert 110 as a means for coupling the interconnection module 200 in the cavity 101 of the fitting will be described in additional detail for a non-limiting embodiment of a metal fitting 105 with respect to FIG. 3-8.

When the interconnection module 200 also includes a battery module 120 it has an inner cavity 121 for receiving a battery 30 and an open distal end 123 defined by the region with rim 1211 and a rim flange 124 surrounding the open distal end 123 for coupling to the flange insert 110. The rim flange 124 may be secured to the flange insert 110 with screws 114 that pass through a series of holes 124h in the rim flange 124, which optionally couple to the helically threaded apertures 115 in the flange insert 110. The helical threads of the aperture 115 may be provided by welding or otherwise attaching nuts. The screws 114 also may optionally engage the perimeter of a single aperture.

An end cap 140 may be provided to close the open distal end 103 of the first fitting 105. The end cap 140 may form a portion of the housing 210 that contains the components of the electronic module 21. The end cap 140 is configured for attachment to the battery module 120, as it includes the male appendage 244, which in this embodiment is now as the cylindrical portion 144. When the cavity 101 has a non-circular cross-section, the flange insert 110 preferably has a corresponding shape to provide more surface for the gasket or O-ring 130 to seal the cavity 101.

As it is preferably to form a flush interface on both sides of the gasket or O-ring 130, the flange insert 110 may deploy various placement of the holes, bore and cylinders for receiving the screws 114 to properly align the long axis of the cavity 101 to achieve the flush interface when the end cap 140 is rotated for full insertion of the cylindrical portion 144 into the battery module 120

The helically threaded 114h bores that act like nuts to receive screws 114 may be formed integrally about the rim of the battery module 120. Generally cylindrical posts 1149 that contains these helically threaded bores 114h can be distributed about the rim in a rim flange 124 that extends from the opening of the battery module 120, and may be configured to also pass into receiving straight holes in the flange insert 110. The screws 114 may then expand the bore diameter to lock the cylindrical post 1149 in the receiving holes in the flange insert 110. Alternatively, the cylindrical posts 1149 may contain simple through holes for receiving the screws 114, which bind with the edges of the holes in the flange insert 110. The length or height of these generally cylindrical posts 1149 then provide spacing of the battery module 120 from the flange insert 110.

The battery module 120 may also have a first circuit board 125 and at least one external lead 127. The external lead 127 is configured to extend at least into the elongated cavity 101, and eventually through a hole or bore 1121 in the flange 112 of the handle 100. The external lead 127 preferably contains 2 wire conductors that join at a thermal sensor 7, such as a thermocouple or thermistor that is housed within a protective sheath. The protective sheath may extend into the cookware, such as cavity or bore 11 to position the thermocouple or thermistor at a desirable location for measuring the temperature of the vessel at a position that is representative of the environment of the foodstuff therein. The external lead 127 may be 2 wire conductors that connect to other thermal sensor 7, or other sensor or transducers, such as pressure transducers, or circuit components formed on or integrally formed in making the vessel. The external lead 127 may be a single conductive wire in such cases as the body of the vessel or a circuit formed on or integrally with the vessel provide another conductive path back to the electronic component in the handle 100.

The battery module 120 may have at least one internal battery terminal 122 connected to a first circuit board 125. The external lead 127, or conductive wires of the external lead 127, may be connected to the first circuit board 125. Further, the first circuit board 125 may have a plurality of external terminals, such as 126, 126' and 126". Such external terminals may be in one or more of power or signal communication with the internal battery terminal connections 122 and the external lead 127. The external lead 127 reaches the sidewall 12 of the cookware vessel 1 by optionally extending through a hole 1121 is the flange 112. Although the hole 1121 is illustrated as being formed in a solid portion of the handle 100 that may be cast metal, such a hole 1121 may be inherently present when the handle is formed of a tube or tube like structure by rolling or folding flat or planar metal. While the flange 112 is solid it is preferably attached or fastened to the cookware vessel 1 sidewall 12 by rivets, but like other forms of handles, may be attached by welding or via nuts that connect to threaded studs that are welded to the cookware vessel 1 sidewall 12.

An aspect of the invention is that the handle 100 may have primarily a metal exterior but still be manufactured at a lower cost that fully cast metal handles. The flange 112 can be cast metal, with the holes or bore formed integrally during casting. The cavity 101 may be provided by metal tubing that forms walls of the first fitting 105, and is then welded to the flange 112, and thereafter ground and polished to provide the appearance and durability of solid metal, yet at reduced cost and weight.

The handle 100 when fully assembled may also comprises an end cap 140. The end cap 140 may essentially seal the cavity 101, and may provide an end hole 147 for hanging the handle 100 from a rack or hook. In the preferred embodiments, the end cap 140 has a generally cylindrical portion 144 that extends from a proximal side of the end cap 140 that is opposite from the distal side having the end hole 147. The cylindrical portion 144 may have one or more threaded sections 145' at the proximal end of the cylindrical portion 144. The cylindrical portion 144 may have one or more threaded sections 145 at the distal end of the cylindrical portion 144. These one or more threaded sections 145 and/or 145' are for connecting these helical threads 149 to mating interior threads 129 and/or 129' of the battery module 120 when the cylindrical portion 144 is inserted part way into the battery module 121. Hence, rotating end cap 140 engages these pairs of mating threads to draw the cylindrical portion 144 further into the battery module 121, while turning in the opposing direction is then operative to release and withdraw the end cap 140 from the battery module 121 and then the battery module 120. As shown in FIG. 6B, the battery module 120 has a set of inner threads 129 just forward of the space that receives the battery 30 to receive the mating threads 145 on the cylindrical portion 144. The battery module 120 also has a set of outer threads 129' inside of the opening 123 to receive the mating threads 145' on the opposing side of the cylindrical portion 144 from mating threads 145. It should be appreciated that in alternative embodiments, any pair of mating threads can be replaced with a bayonet style rotary connecting fitting.

The end cap 140 may contain a second circuit board 150 or equivalent structure that contains the one or more electronic components that are protectively sealed in the handle 100. Such equivalents include any method of forming conductive traces on any other components, such as the end cap 140 or a component for coupling thereto. Methods of forming conductive traces, vias and other connection points on injection molded parts are well known, so that the description of the first and second circuit boards includes any such components in addition to traditional planar circuit boards. It should be appreciated that the end cap 140 may be significantly smaller or shorter than the interconnection module 200 in some embodiments, but much longer or larger in others when it is desirable for the end cap 140 to house larger or addition components as part of the electronic module 21.

The cylindrical portion 144 may have a plurality of terminals 1146, 1146' and 1146" that are disposed about the portion between the threads and inner flange 1145 of the end cap 140 which is adjacent to proximal end of cylindrical portion 144. The cylindrical portion 144 may have at the distal end a battery terminal 1447. The plurality of terminals 1146, 1146' and 1146" may connect to the second circuit board 150 via wires 151. Screwing the end cap 140 into the battery module 121 via the mating threads may accomplish several purposes. First, the battery terminal 1447 contacts the terminal 37 of a battery 30 in the battery module 120. Further, screwing the end cap 140 into the battery module 121 also aligns and brings into mutual ohmic contact respectively between the terminals 1146, 1146' and 1146" of the second circuit board 150 with the terminal 126, 126' and 126" of the first circuit board 125. Third, as the end cap 140 has a gasket means for sealing, such as an O-ring 1442 on the groove 1441 in the cylindrical portion 144, screwing the end cap 140 into the battery module 121 also urges the O-ring 1442 to seal all the components and terminals with the battery module 120 as well as the cavity 101 in the handle 100. Hence, electronic components on the second circuit board 150 are then respectively in one or more of signal and power communication with the external lead 127, and any sub-components thereof, including terminals 37 and 38 for power from the battery 30 in the battery module 121. The first circuit board 125 may provide terminal 126 to connect with battery terminal 38. The circuit board 125 may also connect to other sensors in the cookware vessel 1 or lid or portion of the handle 100, such as a loop circuit for inductively charging a battery, such as battery 30.

Further beyond the groove 1441 for the O-ring 1442, the cylindrical portion 144 and/or battery module 121 may be configured to have deliberate point of contact or end stop means that limits further rotation of the end cap 140 to preclude the rotation of the end cap 140 past the position for alignment of the terminals 1146, 1146' and 1146" of the second circuit board 150 with the terminals 126, 126' and 126" of the first circuit board 125. This end stop means can be another helical or partial helical groove on the inner wall of the battery module 121 that accepts at least a partial helical thread 1148 on the cylindrical portion 144. Such a thread can then terminate at an extending flanges that blocks further movement of the thread into the helical groove by contacting a wall adjacent the groove. Such an end stop means can be using with the threaded sections 145 that are also for connecting the threads 149 to mating interior threads 129 of the battery module 120.

More preferably, a first generally annular outer gasket 130 is disposed to seal the rim 102 of the elongated handle cavity 101 on a proximal side being disposed at a proximal end of the end cap 140. This annular outer gasket 130 is preferably coupled to the rim 1211 of the battery module have an inner groove region that receives a mating rim flange 124 of the battery module 121 rim. The gasket 130 may be configured with a resilient material to compress and/or undergo one or more bellow like folds to seal the rim 1211 of the battery module and the end cap 140. The gasket 130 may also be configured with a resilient material to compress and/or undergo one or more bellow like folds to seal the rim 102 of cavity 101. The gasket 130 may also be configured with a resilient material to compress and/or undergo one or more bellow like folds to seal to the flange 1145 of the end cap 140. The gasket 130 can be configured to accommodate variable levels of compression and seal to accommodate tolerance variations in the assembly and manufacture of the handle 100 and the size and placement of the flange insert 110 in elongated handle cavity 101 being configured to seal the handle cavity 101 at the rim 102.

The $2^{nd}$ circuit board 150 may be enclosed in a recess 141 in the end cap 140, the recess 141 being sealed by an insert 146. The insert 146 is inserted form the side of the end cap 140 that has the terminal portion that provides the perimeter of hanging hole 147, and is optionally sealed with adhesive or ultrasonic welding.

When hanging the cookware vessel 1 by a hook that is inserted through hole 147, the load is transferred to the battery module 120 and the flange insert 110 via the strong threaded connection of the cylindrical portion 144 of the end cap 140 to the threaded portion of the battery module 121. Neither the electronic components or circuit boards 125 and 150, and associated wiring are placed under stress when hanging the cookware vessel 1 in this manner.

Any gaps at a periphery of the wiring 151 that extends outside the battery module, as well as the external lead(s) 127, and internal terminals may be sealed with adhesive to preclude water or fluid ingress.

It should now be appreciated how the handle 100 disclosed herein is both dishwasher safe, with a simple method of assembly that permits changing of the battery in the battery module 120 by merely unscrewing the end cap 140.

It should also be appreciated that while the battery module 120 and end cap 140 are relatively complex in structure, they can be readily produced by injection molding. It is preferable to use as heat resistant plastic as possible, but as the connection and walls of the fitting 105 that define the interior of the cavity 101 are of limited area, the transfer of heat during cooking that could soften these plastic components is minimized. In fact, the direct conduction via metal can for example be limited to the spot welded points that connect the flange insert to the 110 to the walls of the fitting 105. It should also be appreciated that in the case of a molded plastic cookware handle 100, or a cookware handle with a molded plastic providing at least the grip portion of the handle 100, the battery module 121 may be molded into the handle 100, which in essence integrally forms a flange insert 110 or a flange insert means. It should be appreciated that the gasket 130 is preferably formed of silicone rubber or a fluoro-silicone rubber to impart compressive resilience, pliability and temperature resistance.

It should also be appreciated that separating the battery 30 from the electronic components of the electronic module 21 makes it easier to repair or replace such components, conduct firmware updates, or replace the end cap 140 to add new capabilities to the cookware handle, as well as interchange end caps 140 to work with different cookware vessel types, such as a sauce pan versus a skillet. It should be appreciated that the end cap 140 may also contain or provide an external visual display, such as indicator lights or a digital display of battery charge state or life, and the temperate or other condition measured with the sensor electronics, as well as various user interfaces for signaling and programing, such as external membrane switches and buttons.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

For example, while the invention has been illustrated and described with respect to an elongated cookware handle, the cookware handle may have other shapes, such as a shorter U-shape (as in FIG. 10), and the battery module can have any shape necessary to accommodate the number and type so battery, such as longer and/or wider for multiple batters, or shorter for one or more button style batteries, in addition to rectangular shapes. For different battery types and shapes an intermediate cover for an electrical interconnect between the battery terminals and the end cap electrical components may be deployed.

In other embodiments of the invention, the end cap 140 may contain an electronic display 701 and a user control interface 702, such as a touch screen or membrane switches. The user control interface 702 may provide for modulation of the information displayed on the electronic display 701.

The end cap 140 may contain additional batteries 30 in compartment 729 to power the display 701 or other components of the electronic module 21.

Figure 7:
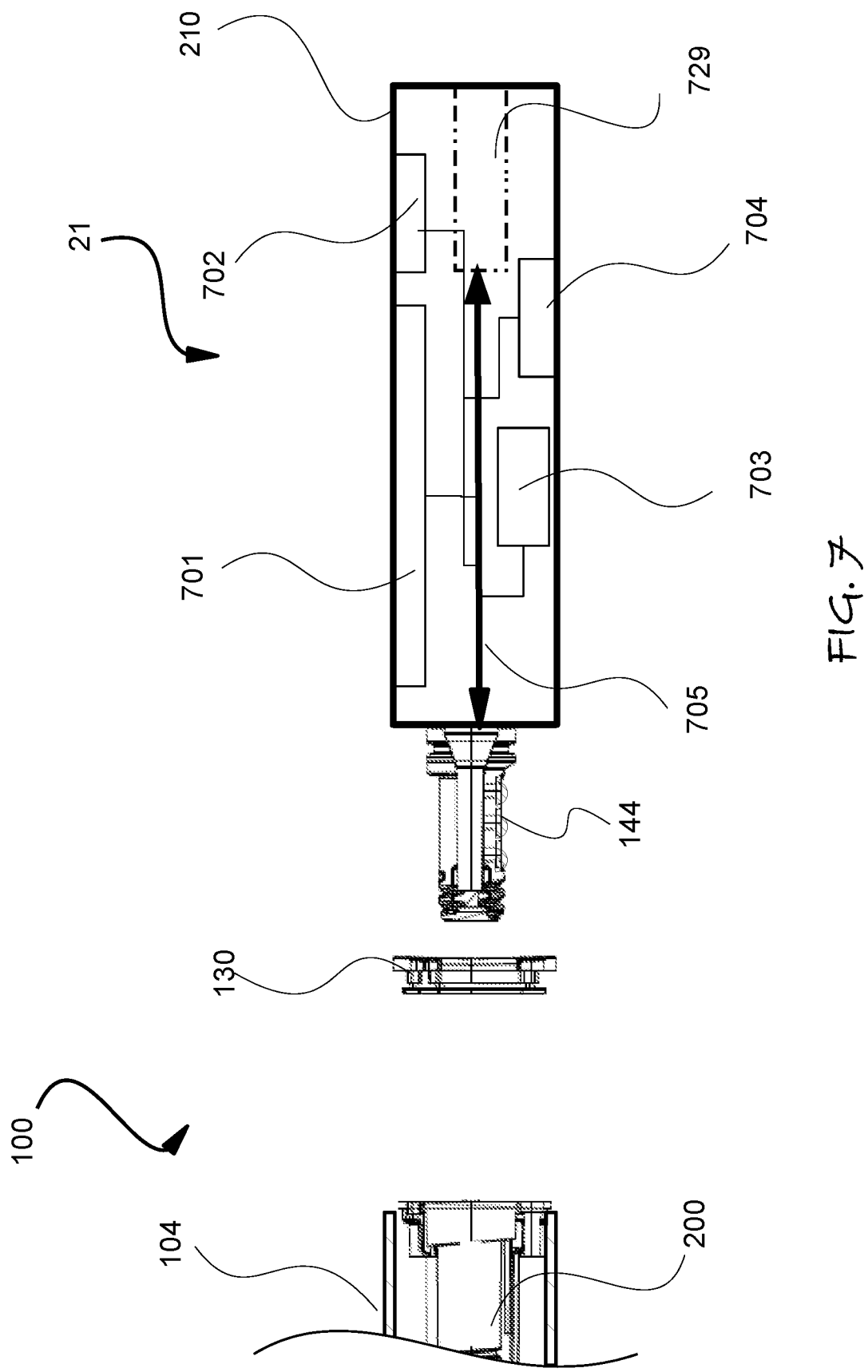
FIG. 7 is a schematic exploded cross-section view of another embodiment of the invention.

The battery module 120 may be an interconnection module 120' for attaching an end cap 140' that contains batteries and other components, and may form a portion of the handle grip FIG. 7 is a schematic exploded cross-section view of another embodiment of the invention in which the electronic module 21 may optionally have a separate battery module 729, an electronic display 701, user interface 702, an one or more of the following components accelerometer 703, and a transmitter, receiver and/or transceiver 704. These components are shown as being connected to each other and the battery 30 in battery module 729 by a common data bus 705.

Figure 8:
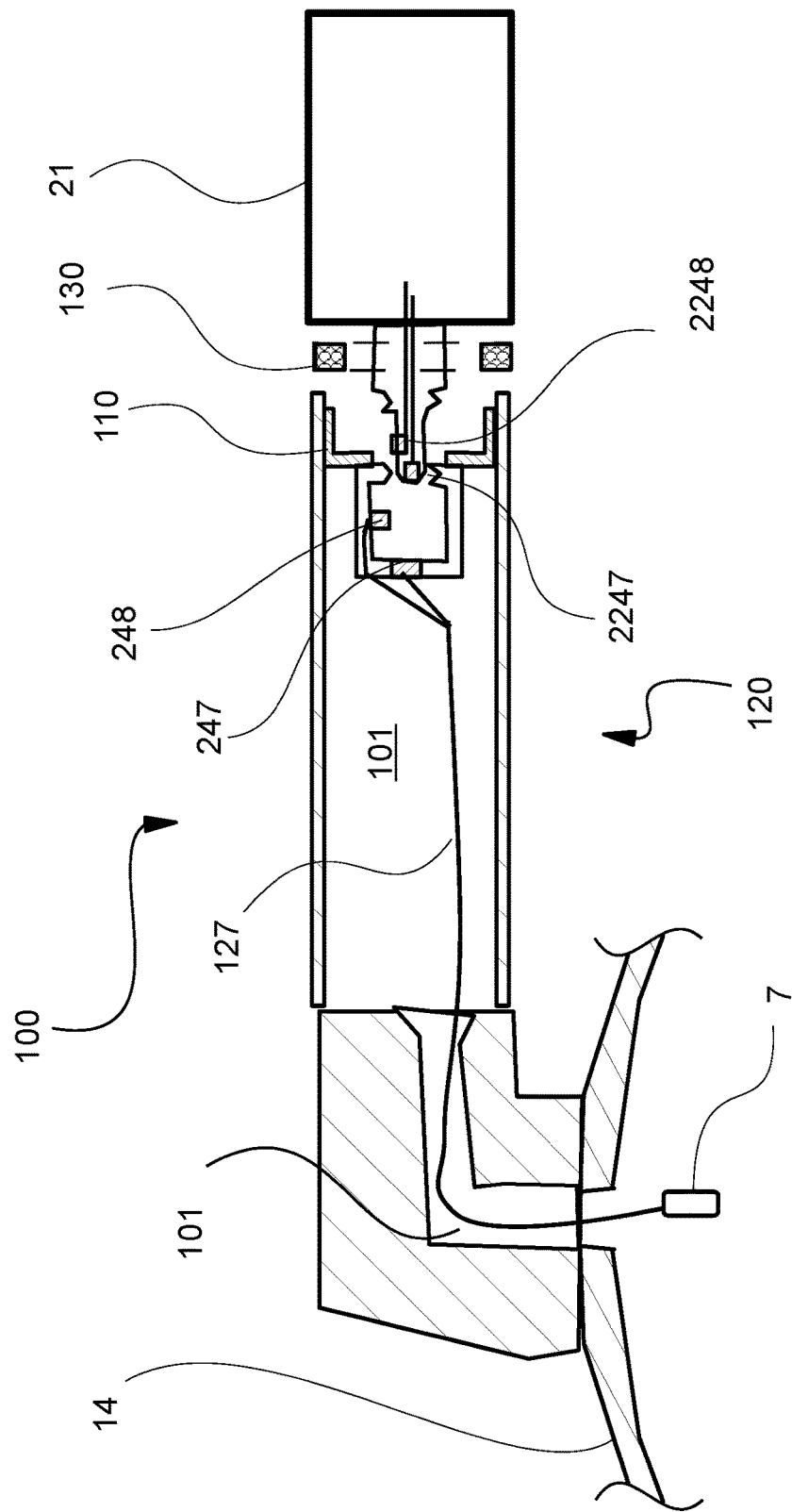
FIG. 8 is a schematic cross-section view of another embodiment of the invention

FIG. 8 is a schematic cross-section view of another embodiment of the invention in which the handle 100 is mounted to the lid 14 of a cookware vessel 1. The handle 100 extends laterally from a center of the lid 14 in the as in the other embodiments in which the handle 100 is connected to the sidewall 12 of the cookware vessel 1

FIG. 9 is a schematic cross-section view of another embodiment of the invention in which the handle 100 is mounted to the lid 14 of a cookware vessel 1, but is knob shaped, that is extends upward from about the center of the lid 14, rather than laterally as in the embodiment of FIG. 7. The thermal sensor 7 is disposed to measure the temperature of the space within a pot type cookware vessel 1 below the lid 14.

FIG. 10 is a schematic cross-section view of another embodiment of the invention in which the handle 100 is U-Shaped with two points of attachment to the cookware vessel 1 sidewall 12.

FIGS. 11A and 11B are schematic cross-section views of another embodiment of the invention in which the interconnection module 200 is in the portion of in the fitting 105, but extends at least in part as a cylindrical projection 7244 that is received in a corresponding recess 244 in the electronic module 21. FIG. 11A illustrates the disassembled state in contrast to the assembled state in FIG. 11B.

The cylindrical projection 7244, like male appendage 244, has external terminals, but they are now 247 and 248. The housing 210 has a female cavity 244 with 2 or more external terminals, such as 1146 and 1146' that are in signal or power connection with the electronic module 21. The base of the female cavity 244 is shown with helical threads 545 that engage the mating threads 2545 at the end of the cylindrical projection 7244.

The insertion and sealed engagement of the cylindrical projection 7244 of the interconnection module 200 into the female cavity 244 via the mating threads 545 and 2545 brings terminal 126 into contact with terminal 1146, terminal 126' into ohmic or electrical contact with terminal 1146' and terminal 126" into ohmic or electrical contact with terminal 1146". Further, as in other embodiments, the O-ring 1442 is compressed to mating surfaces of the handle 100 and the housing 210 to seal the cavity 101 and recess 244 from the ingress of fluid when using cleaning or washing the cookware. To the extent it is desirable to wash the cookware vessel 1 of any of the embodiments in which the heat would potentially damage a battery 30 or electronic components, they can readily be removed and the handle 100 sealed closed for such washing or related treatment.

What is claimed is:
1. A handle for a cookware article that comprises:
   a. a flange portion having a distal end for connection to one of a cookware vessel and a lid of the cookware vessel, the flange portion also having a proximal end opposing the distal end,
   b. an elongated cavity extending from the distal end of the flange portion toward a rim that defines a perimeter of an open distal end of the elongated cavity,
   c. an interconnection module disposed within the elongated cavity, the interconnection module comprising a battery module for receiving one or more batteries, wherein the battery module is held within the elongated cavity, d. an electronic module for sealing the open distal end of the elongated cavity at the rim to form at least a distal portion of the handle for the cookware article, the electronic module comprising at least one electronic component, wherein the battery module is separate from the electronic module so as to allow the battery module to remain held within the elongated cavity when the electronic module is separated from the rim of the elongated cavity, e. one of the interconnection module and the electronic module comprising a male appendage that is received in the other module of the interconnection module and the electronic module, f. at least one external lead that extends from the flange portion to the interconnection module to make a connection with a first terminal of the electronic module, wherein said first terminal is in one of signal and power connection to the at least one electronic component in which the connection is capable of being disengaged when the electronic module is rotated with respect to the interconnection module to disconnect a pair of contact terminals of which a first contact terminal of the pair is on the male appendage and a second contact terminal of the pair is on the other module of the interconnection module and the electronic module that does not comprise the male appendage.

2. The handle for a cookware article according to claim 1 wherein the connection of the first terminal of the electronic module is disengaged from the interconnection module when the electronic module is separated from the rim of the elongated cavity.

3. The handle for a cookware article according to claim 1 wherein the first contact terminal of the pair is on a cylindrical surface of the male appendage.

4. The handle for a cookware article according to claim 3 further comprising a gasket to provide a common seal between the rim of the elongated cavity and a rim of the electronic module.

5. The handle for a cookware article according to claim 3 further comprising a gasket to provide a common seal between the rim of the elongated cavity and the rim of the electronic module and wherein the cylindrical surface of the male appendage further comprises at least one annular o-ring to seal the battery module.

6. The handle for a cookware article according to claim 3 wherein the male appendage has a set of external helical threads that engage a set of internal helical threads on a portion of the other module of the interconnection module and the electronic module in which one of the internal helical threads and external helical threads has an end stop that limits the rotation of the male appendage to align and connect the terminals of the electronic module to mating terminals of the interconnection module.

7. The handle for a cookware article according to claim 3 wherein the male appendage has a first set of external helical threads adjacent a distal end of the male appendage, wherein the first set of external helical threads enter the other module of the interconnection module and the electronic module, wherein the male appendage has a second set of external helical threads disposed at a proximal end of the male appendage that is opposed from the distal end, wherein the first and second set of external helical threads each engage a corresponding sets of internal helical threads on spaced apart portions of the other module of the interconnection module and the electronic module.

8. The handle for a cookware article according to claim 3 further comprising a plurality of contact terminals disposed on each module between a first and a second set of helical threads.

9. The handle for a cookware article according to claim 3 wherein the male appendage has a first set of external annular threads adjacent a distal end of the male appendage that first enters the other module of the interconnection module and the electronic module, and a second set of external annular threads disposed at a proximal end of the male appendage that is opposed from the distal end in which the first and second set of external annular threads each engage corresponding sets of internal thread on spaced apart portions of the other module of the interconnection module and the electronic module.

10. The handle for a cookware article according to claim 9 further comprising a plurality of contact terminals disposed on each module between the first and second set of external annular threads.

11. The handle for a cookware article according to claim 9 further comprising a gasket to seal the rim of the elongated cavity and seal the electronic module and wherein the cylindrical surface of the male appendage further comprises a first annular o-ring to seal the battery module and a second annular o-ring.

12. The handle for a cookware article according to claim 1 wherein a cylindrical surface of the male appendage comprises one or more additional contact terminals that form a disengageable signal or power connection between the interconnection module and the electronic module.

13. The handle for a cookware article according to claim 1 wherein the male appendage is on the electronic module and is received within a cavity within the interconnection module when the electronic module seals the open distal end of the elongated cavity at the rim to form at least a distal portion of the handle for the cookware article.

14. The handle for a cookware article according to claim 13 wherein the battery module includes opposing polarity terminals that are capable of a disengageable connection to the electronic component of the electronic module when the electronic module and interconnection module are separated to one of remove and insert the one or more batteries in the battery module.

15. The handle for a cookware article according to claim 14 wherein the electronic module comprises an O-ring seated in an annular groove that is adapted to seal the battery module when an end cap containing the electronic module compresses a first generally annular outer gasket to seal the rim of the elongated cavity.

16. The handle for a cookware article according to claim 1 further comprising a gasket to provide a common seal between the rim of the elongated cavity and the rim of the electronic module.

17. The handle for a cookware article according to claim 1 wherein the cookware article is the cookware vessel and the handle is connected to a sidewall of the cookware vessel via a flange.

18. The article of cookware comprising one of the lid and a vessel body that is attached to the handle according to claim 17 in which the electronic module of the handle comprises at least one of a user interface and a display.

19. The handle for a cookware article according to claim 1 wherein the cookware article is the lid for covering the cookware vessel.

20. The handle for a cookware article according to claim 1 further comprising a flange insert disposed adjacent the rim of the elongated cavity in which the interconnection module is coupled to the flange insert to space exterior surface of the interconnection module away from an interior wall of the elongated cavity.

21. An article of cookware comprising: one of a lid and vessel body that is attached to a handle in which the handle comprises a flange portion having a distal end for connection to one of a cookware vessel and the lid of a cookware vessel, the flange portion also having a proximal end opposing the distal end,
 a. an elongated cavity extending form the distal end of the flange portion toward a rim that defines a perimeter of an open distal end of the elongated cavity,
 b. an interconnection module disposed within the elongated cavity, the interconnection module comprising a battery module for receiving one or more batteries, wherein the battery module is held within the elongated cavity,
 c. an electronic module for sealing the open distal end of the elongated cavity at the rim to form at least a distal portion of the handle for the cookware article, the electronic module comprising at least one electronic component, wherein the battery module is separate from the electronic module so as to allow the battery module to remain held within the elongated cavity when the electronic module is separated from the rim of the elongated cavity,
 d. one of the interconnection module and the electronic module comprising a male appendage that is received in the other module of the interconnection module and the electronic module,
 e. at least one external lead that extends from the flange portion to the interconnection module to make a connection with a first terminal of the electronic module, wherein said first terminal is in one of signal and power connection to the at least one electronic component in which the connection is capable of being disengaged when the electronic module is rotated with respect to the interconnection module to disconnect a pair of contact terminals of which a first contact terminal of the pair is on the male appendage and a second contact terminal of the pair is on the other module of the interconnection module and the electronic module that does not comprise the male appendage.

22. A handle for a cookware article that comprises:
 a. an elongated cavity with a rim that defines a perimeter of an open distal end thereof,
 b. a flange insert disposed within the elongated cavity and set back from the open distal end of the elongated cavity,
 c. a battery module having an inner battery compartment for receiving a battery and an open distal end and a rim flange surrounding the open distal end for coupling to the flange insert, and further comprising a first circuit board and at least one external lead in which the battery module extends at least into the elongated cavity and has at least one first internal battery terminal connected to the first circuit board and in which the first circuit board has a plurality of external terminals, each in one of a power or signal communication with the at least one first internal battery terminal and the external lead, the battery module further comprising a first threaded section positioned in-between the battery compartment and the plurality of external terminals of the first circuit board, the battery module further comprising a second threaded section positioned in-between the plurality of external terminals of the first circuit board and the open distal end, the battery module further comprising a third non-threaded section positioned in-between the first threaded section and the second threaded section;
 d. an end cap with a plurality of threaded sections for insertion into the battery module for connecting to mating threads of the battery module to seal the open distal end of the elongated cavity, the end cap being configured to house a second circuit board to connect to at least one external terminal of the first circuit board when the end cap seals the open distal end of the elongated cavity, wherein the portion of the end cap that enters the battery module has a plurality of external terminals that connect to the first circuit board and that are disposed on the sides of a cylindrical portion of the end cap, wherein the end cap further comprises a second internal battery terminal on an end of the cylindrical portion of the end cap, the second internal battery terminal for making electrical connection to an opposing terminal of the battery when the battery is received in the battery compartment, wherein the plurality of threaded sections of the end cap comprise a fourth threaded section and a fifth threaded section, wherein the fourth threaded section is positioned at a proximal end of the cylindrical portion of the end cap and wherein the fifth threaded section is positioned at a distal end of the cylindrical portion of the end cap, wherein the cylindrical portion of the end cap further comprises a sixth non-threaded section positioned in-between the fourth threaded section and the fifth threaded section,
 e. a first generally annular outer gasket disposed to seal the rim of the elongated cavity on a proximal side and the end cap on a distal side.

\* \* \* \* \*